United States Patent [19]
Feldmann et al.

[11] Patent Number: 5,294,190
[45] Date of Patent: Mar. 15, 1994

[54] BRAKE SYSTEM WITH AT LEAST ONE BRAKE CIRCUIT

[75] Inventors: Joachim Feldmann, Neustadt; Erwin Peterson, Wunstorf; Manfred Schult, Garbsen, all of Fed. Rep. of Germany

[73] Assignee: WABCO Westinghouse Fahrzeugbremsen GmbH, Hanover, Fed. Rep. of Germany

[21] Appl. No.: 664,880

[22] Filed: Mar. 5, 1991

[30] Foreign Application Priority Data

Mar. 17, 1990 [DE] Fed. Rep. of Germany ....... 4008601
May 22, 1990 [DE] Fed. Rep. of Germany ....... 4016463

[51] Int. Cl.$^5$ ............................ B60T 13/68; B60T 8/38
[52] U.S. Cl. ............................................. 303/3; 303/15; 303/118.1
[58] Field of Search ................... 303/3, 7, 15, 118

[56] References Cited

U.S. PATENT DOCUMENTS

| | | | |
|---|---|---|---|
| 4,568,129 | 2/1986 | Stumpe | 303/15 |
| 4,616,881 | 10/1986 | Muller et al. | 303/15 |
| 4,861,115 | 8/1989 | Petersen | 303/15 |

FOREIGN PATENT DOCUMENTS 3603143 8/1987 Fed. Rep. of Germany ........ 303/15

*Primary Examiner*—Matthew C. Graham
*Attorney, Agent, or Firm*—Horst M. Kasper

[57] ABSTRACT

A brake system with at least one brake circuit comprises a mechanical brake-pressure control device and an electrical brake-pressure control device. The brake system is constructed without additional expenditure and by use of a mechanical brake-pressure control device and by an electrical control valve device. The system is constructed such that the brake-pressure modulator (8) of the electrical brake-pressure control device (6, 8, 11, 19) can also be controlled by pressure. The brake-pressure modulator (8) meters the brake pressure, both on the strength of the supplied electrical signal as well as according to the value level of the fed-in redundant brake pressure. The control electronics (11, 19) of the electrical brake-pressure control device (6, 8, 11, 19) is constructed such that it sets the strength of the electrical signal to a value required for covering and for meeting the respective brake-pressure demand request. The invention structure can be employed preferably in connection with road vehicles and motor vehicles.

14 Claims, 4 Drawing Sheets

BRAKE SYSTEM WITH AT LEAST ONE BRAKE CIRCUIT

BACKGROUND OF THE INVENTION

1. Field Of the Invention

The invention relates to a brake system with at least one brake circuit, actuated by a feeding of a brake pressure, with a mechanical brake-pressure control device and an electrical brake-pressure control device.

2. Brief Description of the Background of the Invention Including Prior Art

Such a brake system is actuated predominantly by the electrical brake-pressure control device. In case of a fault in the electrical brake-pressure control device, the brake system remains functioning based on the redundant brake-pressure transmitted by the mechanical brake-pressure control device.

Such a brake system is known from the German Patent Document herein incorporated by reference DE-OS-3,501,179-A1. The brake-pressure modulator of this brake system is formed as a blockin device with respect to the redundant brake pressure. For this purpose, the brake-pressure modulator of the German Printed Patent Document, herein incorporated by reference, DE-OS-3,501,179-A1 is structured such that, upon actuation of the brake system in the sense of an increasing or level-maintaining brake pressure, its passage is blocked for the redundant brake pressure and, upon actuation in the sense of a falling brake pressure, its passage is open. Thereby, the desired brake-pressure drop is made possible by means of the mechanical brake-pressure control device.

If the known brake system is to comprise one or several elements, which require a particularly quick brake-pressure drop, then the brake system has to contain an electrically controlled valve device, as taught for example in FIG. 2 of the German Printed Patent Publication, herein incorporated by reference DE-OS-3,501,179-A1. This electrically controlled valve device assures the required quick brake-pressure drop during operation of this element or these elements, respectively. Such elements are, for example, an anti-skid protection system and a superposed electrical or hydraulic long-time brake, conventionally designated as retarder.

The German Printed Patent Document DE 3,212,930 to Werner Stumpe, herein incorporated by reference, teaches a multi-circuit braking system. A pressure control valve is employed which, on the one hand, assures that the control circuits are always in use and that the pressures furnished to the brake cylinder compensate in each case.

The German Printed Patent Document DE 2,218,315 to Joseph R. Morse et al., herein incorporated by reference, teaches a braking system for a vehicle. A control unit is furnished by an electronic signal processing unit which delivers electrical output signals, and is connected to a braking valve or to brake cylinders and coordinated to pressure indicators. This electronic signal processing unit compares the signal corresponding to the momentary pressure values present in the brake control valve and in the brake cylinders.

The German Printed Patent Document 1,555,556 to Heinz Nicolay et al., herein incorporated by reference, teaches a pressure operated braking system for vehicles, as well as a relay valve and a solenoid valve for the switching on of a retarder. A relay valve is constructively combined with a solenoid valve such that the double valve body of the relay valve can also be actuated by a piston subjectable to a pressure controlled by the relay valve.

The German Printed Patent Document DE 3,703,639 to Werner Stumpe, herein incorporated by reference, teaches an electro-pneumatic braking system for tractors. An emergency brake release device is furnished, which can be activated in case of an intereruption of a brake line by electrical and/or pneumatic signals generated by an activation of a brake-Pedal The German Printed Patent Document DE 3,240,276 to Ewald Hübl et al., herein incorporated by reference, teaches a pressure control valve for a braking system. The reference employs a solenoid valve disposed at least indirectly analog relative to the brake cylinders for controlling the brake pressure, where the solenoid valve is continuously adjustable depending on the current fed to the solenoid valve.

The German Printed Patent Document DE 3,205,228 to Egbert Müller et al., herein incorporated by reference, teaches a multi-circuit braking system based on a pressurized medium. The pressure control valve of the reference is controlled from several circuits and includes electrical switches for at least one control circuit.

The German Printed Patent Document DE 3,416,338 to Gerhard Fauck et al., herein incorporated by reference, teaches an apparatus for the adaptation of the distribution of the brake force. A delay valve allows the pressure to pass with a value level reduced by the opening pressure in case of a further increasing pressure, once the opening pressure has been reached.

The German Printed Patent Document DE 3,239,970 to Ingolf Grauel et al., herein incorporated by reference, teaches a braking system for a vehicle train. The brake value sensor is formed for controlling both, electrically-actuated and pressure-actuated braking circuits. One of the pressure-activated circuits for controlling the trailed control valves is a pure control circuit.

The German Printed Patent Document DE 2,939,907 to Erich Reinecke, herein incorporated by reference, teaches a dual-circuit braking system. An adapter valve is employed between the control connection for the subjection of the second part face and the conduit carrying the pressure for the rear-axle brake circuit.

The WABCO pocket book addition, published in 1987 illustrates on page 241 a load/empty valve.

SUMMARY OF THE INVENTION

1. Purposes of the Invention

It is an object of the invention to provide a brake system which operates safely and performs reliably the braking function.

It is another object of the invention to prepare a brake system of the kind set forth above for the application of elements which require a particularly quick pressure drop.

It is another object of the invention to provide a brake system which is based on a base-level brake component and a subsidiary quick-reaction component.

It is yet another object of the invention to provide an automatic brake system which assures that at least one component of the brake system will continue to act with a braking force in case one of the two devices should fail to operate properly.

These and other objects and advantages of the present invention will become evident from the description which follows.

2. Brief Description of the Invention

The present invention provides for a brake system with at least one brake circuit actuated by a feeding-in of a brake pressure as well as with a mechanical brake-pressure control device furnishing a redundant brake pressure and with an electrical brake-pressure control device. Said electrical brake-pressure control device comprises at least one brake-pressure modulator, actuated by a magnet and coordinated to the brake circuit, and an electronic control device, controlling the brake-pressure modulator. The brake-pressure modulator is connected at a first inlet port with a pressure supply. A second inlet port of the brake-pressure modulator is connected with the mechanical brake-pressure control device. The outlet port of the brake-pressure modulator, delivering the brake pressure, is connected with the brake circuit. The brake-pressure modulator is of a construction also employing pressure control, which meters the brake pressure both according to the fed-in magnet current strength as well as according to the value level of the redundant brake pressure. The electronic control device is constructed such that it sets the magnet current strength to a value required for covering the momentary brake-pressure demand request.

The electronic control device can deliver a warning signal if the magnet current strength goes beyond and leaves a prespecified set-point region.

The brake-pressure modulator can comprise a dual-circuit relay valve device and a magnet-actuated valve device, connected at the inlet port of the magnet actuated valve device to the first inlet port and delivering a pressure, dependent on the fed-in magnet current strength. The dual-circuit relay valve device is connected at its first control device to the outlet port of the magnet-actuated valve device, and at its second control device to the second inlet port, and at its outlet port to the outlet port, and at its supply connection with the first inlet port.

The mechanical brake-pressure control device can exhibit a retention device. This retention device retains the redundant brake pressure up to a prespecified retaining pressure. The retaining pressure can be a function of the brake pressure delivered by the brake-pressure modulator.

The electrical brake-pressure control device can include a load dependent brake pressure controller. In this case, the retaining pressure can at most be equal to the brake pressure delivered from the brake-pressure modulator in case of an empty vehicle.

The retention device can be furnished by an overflow valve or by a load/empty valve.

At least in a partial brake-value region the brake-pressure demand request can be larger than the redundant brake pressure.

At least one relay valve can be contained in the brake circuit. The brake pressure, delivered by the brake-pressure modulator, is can be as a control pressure to the control device of the relay valve. The relay valve can simultaneously be employed as a magnet-controlled control valve of an anti-skid protection system.

The brake system can include a pressure-controlled trailer control valve and an additional brake-pressure modulator of the kind specified can be present. One pressure control device of the trailer control valve can be connected with the outlet port of the additional brake-pressure modulator.

In accordance with the invention, the magnet current strength is adjusted such that the brake-pressure component, originating from the magnet actuations amounts exactly to the difference between the brake-pressure demand request entered and the brake-pressure components derived from the redundant brake pressure.

In order to monitor the redundant brake pressure, test routines are furnished in the known brake system in which the brake-pressure modulator is automatically actuated in the sense of a falling brake pressure upon actuation of the brake system. During the test routines, the redundant brake pressure can therefore be transferred as a brake pressure to the output of the brake-pressure modulator. A pressure sensor of the electronic control device, serving for a monitoring of the brake pressure, then indicates at which height level the redundant brake pressure is present and available.

In contrast, the invention can be further developed with simple means such that the invention device allows a continuous monitoring of the redundant brake pressure upon brake actuation.

The invention can be performed in connection with any suitable transferring pressure agents. The invention can be performed cost-advantageously by employing substantially commercially available apparatus and equipment. For example, in one embodiment, the pressure-control valve, described in the German Printed Patent Document DE-OS-3,038,797-Al, is employed as a brake-pressure modulator. In another embodiment, the brake-pressure modulator can, for example, be produced of a commercially-available proportional solenoid valve and a commercially available increasing dual-circuit relay valve device.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

Figure 1:
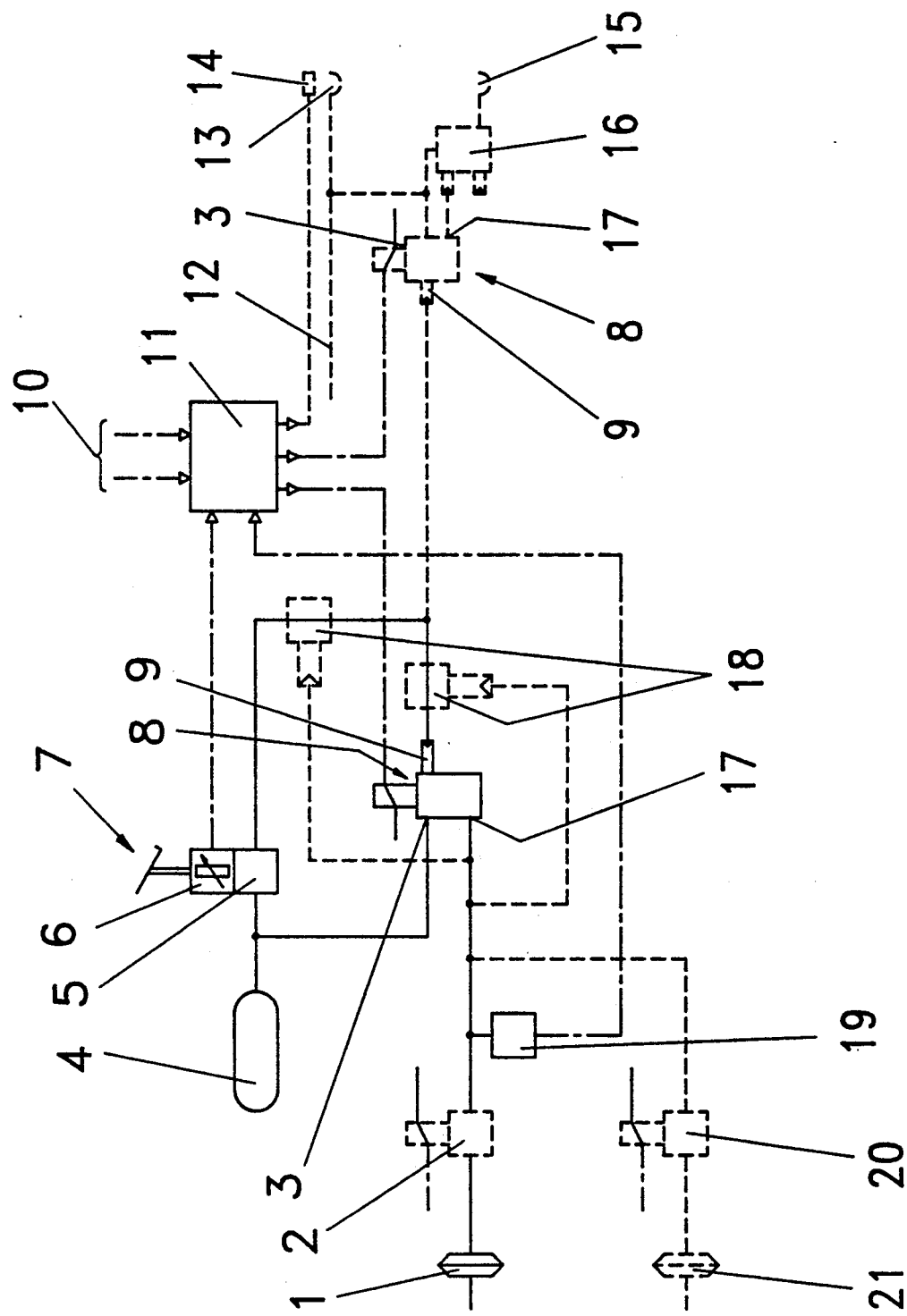
FIG. 1 is a principle schematic diagram of a brake system of a motor vehicle.

The drawings illustrated show throughout the use of solid lines or dashed lines for pressure-means conduits and other components, as well as dash-dotted lines for electrical connections, as well as uniform reference numerals for components performing the same functions.

DESCRIPTION OF INVENTION AND PREFERRED EMBODIMENT

FIG. 1 as drawn schematically with solid lines illustrates a base configuration of a brake system of a motor vehicle including a brake circuit actuated by feeding in of brake pressure, including an actuator 1, as well as with a mechanical brake-pressure control device 5 and an electrical brake-pressure control device 6, 8, 11, 19. Air serves as a pressure medium. The following statements hold also for brake systems employing different pressure media in view of a corresponding adaptation.

The mechanical brake-pressure control device comprises a pressure part 5 of a brake-value furnishing unit 7. The electrical brake-pressure control device 6, 8, 11, 19 comprises an electrical part 6 of the brake-value furnishing unit 7, an electronic control device 11, 19, where the electronic control device 11, 19 includes a control circuit 11 and a brake-pressure sensor 19, and a brake-pressure modulator 8.

The recited components of the brake system are of conventional construction with the exception of the control device 11.

The brake-pressure modulator 8 is connected at an inlet port 3 to a pressure supply 4, and at an outlet port 17 with the actuator 1. The brake-pressure modulator 8 is magnet actuated and pressure actuated. The brake-pressure modulator 8 includes a control device for a pressure actuation. This control device is connected via a second inlet port 9 with the outlet port of the pressure part 5 of the brake-value furnishing unit 7. Consequently, the control device of the brake pressure modulator 8 is subjected to the redundant brake pressure. The brake-pressure modulator 8 includes an actuating magnet or a solenoid, not designated in detail, for magnet actuation. Upon actuation by one or by both actuation devices, the brake pressure modulator 8 connects the actuator 1 with the pressure supply 4, until a brake pressure has built up in the actuator. The height level of this built-up brake-pressure depends both on the fed-in magnet current as well as on the height level of the redundant brake pressure.

The brake pressure delivered by the brake-pressure modulator 8 is thus comprised of a brake-pressure component derived from the redundant brake pressure and on a brake-pressure component derived from the magnet actuation. Depending on the embodiment and structure of the control device of the brake-pressure modulator 8, furnished for the pressure actuation, the brake-pressure component value derived from the redundant brake pressure can be equal or higher or lower as compared to the redundant brake pressure value.

The pressure-control valve described in the German Printed Patent document DE-OS-3,038,797-Al can be employed as a brake-pressure modulator 8. This pressure-control valve is pressure actuated by connection of its venting connection to the outlet of the mechanical pressure part 5 of the brake-value furnishing unit 7 in the sense of the present invention. This brake-pressure modulator 8 determines the brake pressure by adding the brake-pressure components derived from its individual actuation devices. However, any other suitable kind of brake-pressure determination can be employed.

The pressure sensor 19 monitors the brake pressure at the outlet port 17 of the brake-pressure modulator 8 where the brake pressure is delivered to the actuator 1. The pressure sensor 19 delivers a corresponding actual brake-pressure signal to the control circuit 11.

The brake-value furnishing unit 7 delivers an electrical signal at its electrical part 6 upon actuation by the driver and depending on the actuation force or on the actuation path. In the following, this signal is called the actuation signal. Simultaneously,, the brake-value furnishing unit 7 transmits at its pressure part 5 from the pressure supply 4 the redundant brake pressure which depends also on the recited actuation parameters. The brake-pressure control device, represented by the pressure part 5, is called "mechanical" because this brake-pressure control device transforms the actuation parameters fed to the brake-value furnishing unit 7 into the redundant brake pressure in a conventional way and by mechanical means.

The control circuit 11 receives the actuation signal from the electrical part 6 of the brake-value furnishing unit 7 and the brake-pressure signal of the pressure sensor 19 and furnishes the magnet current required for actuation of the brake-pressure modulator 8 to the actuating magnet of the brake-pressure modulator 8. In the base embodiment, the control circuit 11 evaluates the actuation signal as a brake-pressure demand request signal. The control circuit 11 compares this brake-pressure demand request signal to the actual brake-pressure signal and, in case of a deviation, determines and adjusts the magnet current strength to a value suitable for elimination of the deviation, i.e. to a value as necessary for satisfying the momentary brake-pressure demand request. In other words, the control circuit 11 sets the magnet current strength such that the brake-pressure component, derived from the magnet actuation, just corresponds to the difference between the brake-pressure demand request and the brake-pressure component derived from the redundant brake pressure.

The electrical brake-pressure control device 6, 8, 11, 19 and/or the mechanical brake-pressure control device 5 can be constructed such that at least in the partial brake-value region, the brake-pressure demand request is higher than the redundant brake pressure such that a brake-pressure component, derived from the magnet actuation, always occurs at least in the partial brake-value region. In this case, upon a full brake pressure demand request, the brake-value furnishing unit 7 requires a substantially increased actuation force or a substantially increased actuation path for transmitting the full supply pressure as redundant brake pressure.

In addition, a set-point region for the mutual coordination of the magnet current strength and of the brake pressure for the proper functioning of the pressure part 5 and of the pressure actuation of the brake-pressure modulator 8 can be stored in the control circuit 11. The control circuit 11, in this case, can also be constructed such that it determines, under use of the actual brake-pressure signal, the position of the magnet current strength relative to the set-point region and delivers a warning signal if the magnet current strength leaves the set-point region. Due to this construction the electronic control device 11, 19 can serve simultaneously for monitoring the redundant brake pressure, and thus for monitoring the pressure part 5 and the control device for pressure actuation of the brake-pressure modulator 8 with respect to functioning and integrity of its operation. A magnet current strength outside the set-point region indicates too-high a brake-pressure or too-low a brake-pressure component, as derived from the redundant brake pressure. Interferences and/or failures of the pressure part 5 and/or of the pressure actuation of the brake-pressure modulator 8 and/or of the coordinated pressure-medium conduits are thereby indicated.

FIG. 1 illustrates in dotted lines additionally further embodiments of the invention going beyond the previously described base structure and beyond the precedingly described additional feature.

An additional actuator 21 indicates that the brake circuit can also be furnished with several actuators. The additional actuators can be connected to the brake-pressure modulator 8 of the base construction as illustrated. Alternatively, each individual actuator can be provided with its own brake-pressure modulator or several combined actuators can be provided with their own brake-pressure modulator.

It is indicated by automatic control valves 2 or 20, respectively, of an anti-skid protection system, not illustrated in detail, that the invention brake system can also be furnished with an anti-skid protection system. In this case, the brake pressures in the actuator 1 or actuators 1 or 21, respectively, and at the outlet port 17 of the brake-pressure modulator 8 can be different. The electronic control device of the anti-skid protection system can be combined fully or in part with the control circuit 11.

The anti-skid protection valves 2 or 20, respectively, are furnished with their own venting device based on a conventional construction. The anti-skid protection valves 2 or 20, respectively, are disposed, as illustrated, between the outlet port 17 of the brake-pressure modulator 8 and the actuator or actuators 1, 21, respectively. Therefore, the anti-skid protection valves 2 or 20, respectively, permit, if necessary, a very quick brake-pressure drop in the actuator or actuators 1, 21, respectively on the shortest path and thus without further devices.

At least one further signal sensor is indicated by the reference numeral 10. During the determination of the brake-pressure demand request, the control circuit 11 evaluates, in addition to the actuation signal of the electrical part 6 of the brake-value furnishing unit 7, the signal of said signal sensor 10. Such a signal sensor can be furnished, for example, by one or several load sensors, if the electrical brake-pressure control device, designated in this case with the reference numerals 6, 8, 10, 11, 19, comprises a load dependent brake pressure controller. In each case, one or several retarder sensors, draw-bar force sensors, brake-torque sensors, brake-temperature sensors and similar sensors can be considered as additional or alternative signal sensors. According to this further embodiment, it can occur that the brake-pressure component, derived from the redundant brake pressure, exceeds already the brake-pressure demand request. A regulation and adaptation is possible based on the arrangement of a retention device, indicated by the reference numeral 18, in the mechanical brake-pressure control device, in this case designated with the reference numerals 5, 18. This retention device 18 limits the redundant brake pressure up to a predetermined limiting retention pressure.

The retention pressure can be a fixed pressure value or can be variable depending on the requirements of the specific use or application. A fixed pressure value results during employment of a conventional overflow valve as a retention device. A variable retention pressure can, for example, be achieved by employing a retention device according to the principles of the regulating valves according to the WABCO Printed Publications 975,001, Edition March 1977, or 975,002, Edition August 1973. Another possibility by way of example to provide a variable retention pressure, is furnished by the embodiment of a retention device according to the principle of the load/empty valve, illustrated in WABCO Printed Publication 473,300, Edition January 1974. As illustrated, the brake pressure could in this case be fed to the control input of the load/empty valve. If the electrical brake-pressure control device comprises a load dependent brake pressure controller, this embodiment can be particularly adapted to this load dependent brake pressure controller by disposing and constructing the load/empty valve such that the retention pressure is at most equal to the brake pressure delivered from the brake-pressure modulator 8 in case of an empty vehicle.

The total brake-pressure region can be subdivided by the retention device into a partial region with wear-optimized braking and into a second partial region where a good use of the available brake potential is more important. In the first partial region, the redundant brake pressure is lower, and in the second partial region, the redundant brake pressure is higher than the retention pressure.

According to a further embodiment, the preceding exemplified embodiment incorporates a device for co-control of a trailer brake system. This co-control of a trailer brake system comprises a supply line 12 with a supply coupling 13 as well as an electrical and a pressure-actuated control device. The electrical control device comprises a control connection terminal 14 and the control circuit 11. For this purpose, that control circuit 11 is constructed such that it transforms the actuation signal, received from the electrical part 6 of the brake-value furnishing unit 7, and possibly a part or all of the signal sensors 10, into a trailer brake signal. The pressure-actuated control device comprises a trailer control valve 16 and an additional brake-pressure modulator. The trailer control valve 16 corresponds to the conventional pressure-actuated constructions. It is connected on the supply side to the supply line 12 and delivers upon actuation a trailer brake control pressure to a trailer brake line with a brake coupling 15. The additional brake-pressure modulator corresponds in principle to the above-described brake-pressure modulator 8. However, the additional brake-pressure modulator is incorporated in part differently relative to the brake-pressure modulator 8. The additional brake-pressure modulator is connected at its first inlet port 3 with the supply line 12 and at its outlet port 17 with a pressure-control device of the trailer control valve 16. The output port 17 of the additional brake-pressure modulator 8 can also be directly connected with the trailer-brake line, according to an embodiment not illustrated here. The magnet actuation of this brake-pressure modulator 8 is also supplied with magnet current by the correspondingly constructed control circuit 11.

Figure 2:
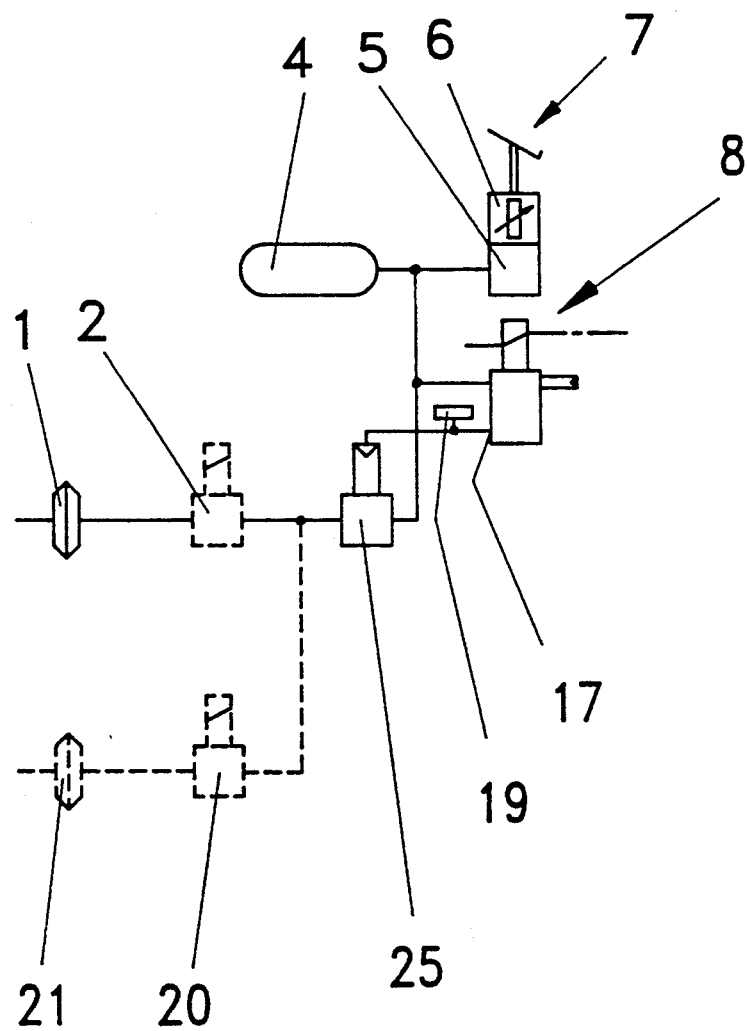
FIG. 2 is a second embodiment of the brake system of the motor vehicle of FIG. 1.

FIG. 2 illustrates in part a further embodiment of the exemplified embodiment of FIG. 1. The further embodiment comprises that the brake circuit includes a relay valve 25. The relay valve 25 is predisposed and/or shunted in a conventional manner relative to the actuator 1 or to the actuators 1, 21, respectively. The control device of the relay valve 25 receives the brake pressure, delivered by the brake-pressure modulator 8, as control pressure.

The brake-pressure sensor 19 is illustrated at the outlet port of the brake-pressure modulator 8. However, the brake-pressure sensor 19 can also be disposed at the outlet port of the relay valve 25.

Otherwise, the statements made relative to FIG. 1 hold in an identical or corresponding way for this embodiment precedingly described.

Figure 3:
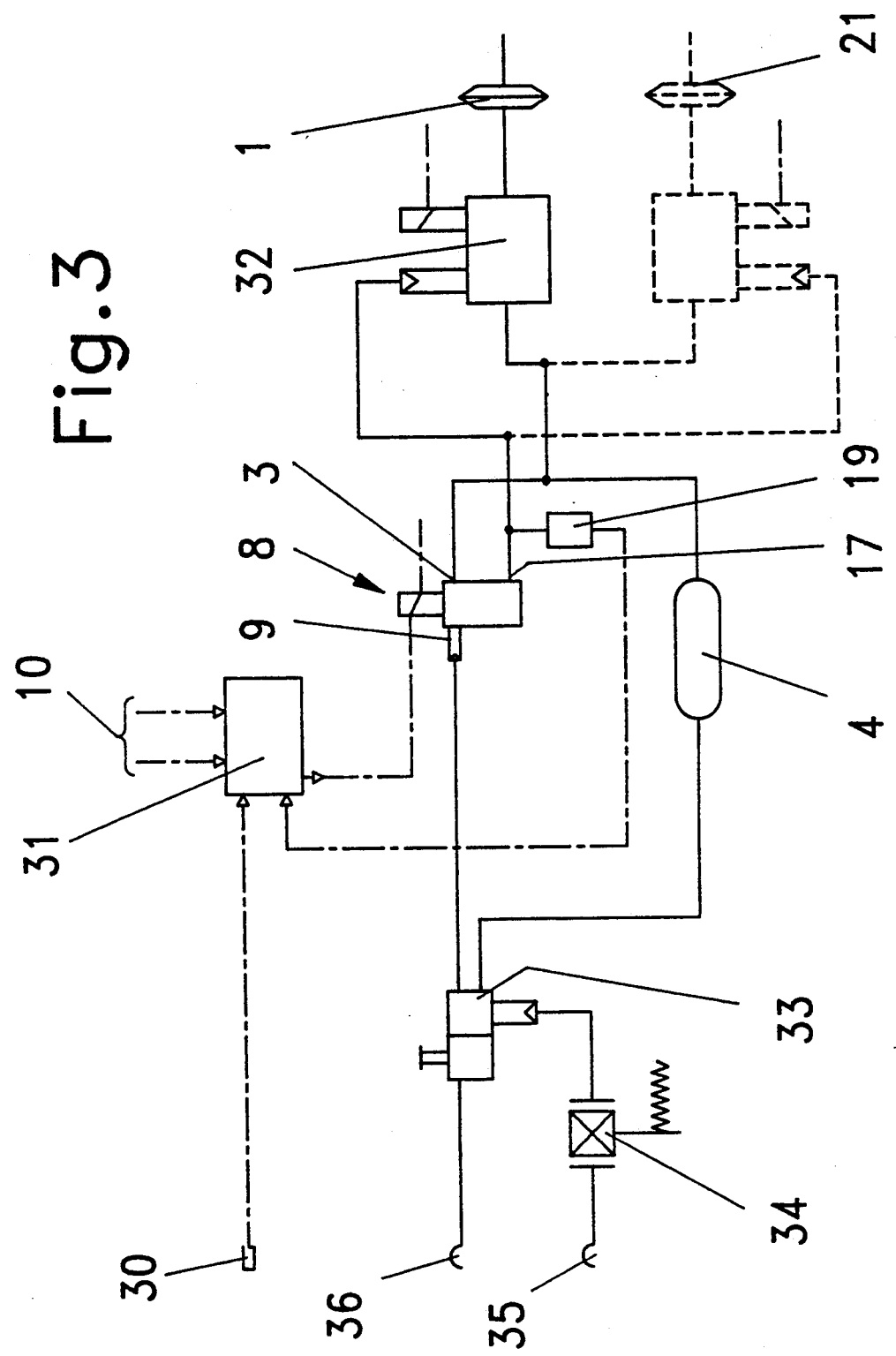
FIG. 3 is a principle schematic diagram of a brake system of a trailer.

FIG. 3 schematically illustrates, in full lines, the base construction of a brake system of a trailer.

The mechanical brake-pressure control device 33, 34 comprises in this case a relay emergency valve 33 and an automatic load-sensing valve 34. The trailer brake valve 33 and the automatic load-sensing valve 34 are of conventional construction and are disposed in a conventional manner. Consequently, the relay emergency valve 33 serves simultaneously for transferring the pressure medium fed via a supply coupling 36 from the motor vehicle to the pressure supply 4. The relay emergency valve 33 is controlled via a brake coupling 35 and a control line, in which control line also the automatic load sensing valve 34 is disposed.

Depending on the individual application, the automatic load-sensing valve 34 can also be eliminated and dispensed with.

The electrical brake-pressure control device 30, 8, 31, 19 comprises an electrical control connection 30, of the electronic control device 31, 19. The electronic control device 31, 19 includes a control circuit 31, a pressure sensor 19, and a brake-pressure modulator. The brake-pressure modulator, designated again with the reference numeral 8, and the brake-pressure sensor, designated again with the reference numeral 19, correspond in their individual construction in principle to the components, designated with the same reference numerals, of the preceding exemplified embodiment. Of course, the connections of these components in the present embodiment do not necessarily correspond to those of the preceding embodiment.

The control connection 30 receives the trailer brake signal generated in the motor vehicle and delivers and feeds this trailer brake signal to the control circuit 31. One inlet port 3 of the brake-pressure modulator 8 is connected with the pressure supply 4 and a second inlet port 9 of the brake-pressure modulator 8 is connected with the outlet port of the relay emergency valve 33. The brake-pressure modulator is connected at its outlet port 17 with the pressure control device of a relay valve 32. The relay valve 32 includes in addition a magnet actuation and thereby simultaneously represents a magnet-controlled anti-skid protection valve of an anti-skid protection system. Such a anti-skid protection valve, also designated as anti-skid relay valve, is described for example in the German Printed Patent Document DE-OS 3,730,779-Al.

The illustrations and explanations given with respect to the mode of operation of the prior embodiment according to FIG. 2 hold identically or correspondingly for this further embodiment according to FIG. 3. In this latter, the trailer brake signal is to be considered equivalent to the actuation signal of the electrical part 6 of the brake-value furnishing unit 7.

A person of ordinary skill in the art will recognize that this embodiment can be derived in the region of the anti-skid relay valve 32 from the base construction and the further embodiments constructions of FIG. 1 and FIG. 2 and that, on the other hand, the latter embodiments can be further developed based on the construction of this exemplified embodiment according to FIG. 3.

Figure 4:
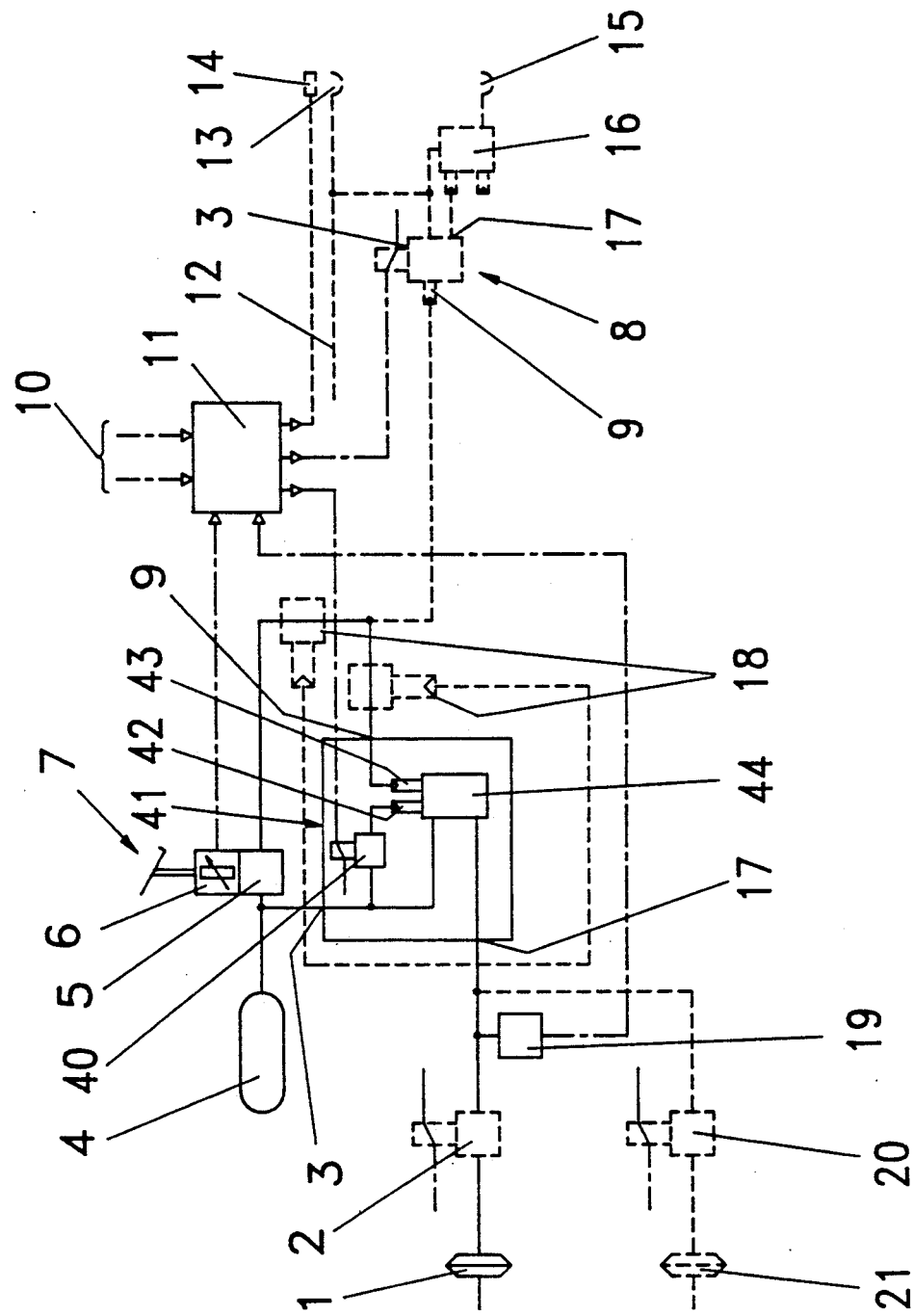
FIG. 4 is an embodiment related to that of FIG. 1 with a different configuration of the brake-pressure modulator.

FIG. 4 illustrates the exemplified embodiment according to FIG. 1 with a further different structure feature of the brake-pressure modulator.

The brake-pressure modulator, designated in this case in general with 41, comprises a dual-circuit relay valve device 44 and a magnet-actuated valve device 40. The dual-circuit relay valve device 44 is of a commercial construction of the additive increasing type. In this case, "additive increasing" means that, there is delivered at the outlet port of the dual circuit relay valve device 44 a higher pressure than upon pressure application at only one of its control devices, upon a simultaneous pressure application at the two of the dual circuit relay valve device 44.

The valve device 40 is formed in a conventional manner such that it functionally controls a pressure dependent on the fed-in magnet current strength. As such a valve device, there can for example be employed a commercially available proportional solenoid valve. The drawn lines surrounding the two recited valve devices 40 and 44 indicate that said valve devices are constructed as a single component for the formation of the brake-pressure modulator 41. The valve devices 40 and 44 can of course perform the function of the brake-pressure modulator 41 alternatively as correspondingly individual devices connected to each other in a corresponding way on the pressure side.

The first inlet port 3, the second inlet port 9, and the outlet port 17 of the brake-pressure modulator 41 are represented as connection points of the corresponding pressure-means conduits at the recited drawn lines. In case of a separate disposition of the valve device 40 and of the dual-circuit relay valve device 44, the inlet ports 3 and 9 as well as the outlet port 17 can coincide with the connections of the valve device 40 or of the dual-circuit relay valve device 44, respectively.

The valve device 40 is connected at its pressure medium inlet with the first inlet port 3. The dual-circuit relay valve device 44 is connected at its supply connection also with the first inlet port 3, at its first control device 42 with the outlet port of the valve device 40, at its second control device 43 with the second inlet port 9, and at its outlet port with the outlet port 17.

The actuator magnet of the valve device 40 represents the magnet actuation of the brake-pressure modulator 41.

Based on the connections of the control devices 42 and 43 of the relay valve device 44 to the valve device 40 or via the second inlet port 9, respectively, with the mechanical brake-pressure control device 5 or, respectively, 5, 18, the dual-circuit relay valve device 44 is controlled both by the pressure transmitted from the valve device 40 as well as by the pressure delivered from the mechanical brake-pressure control device 5 or, respectively, 5, 18, Since the pressure delivered by the valve device 40 depends on the current strength fed to the actuator magnet, the control of the dual-circuit relay valve device 44 at the control device 42 is dependent on this magnet current strength.

Because of the "additive increasing" type of construction of the dual-circuit relay valve device 44, the valve device 40 and the dual-circuit relay valve device 44 produce in connection with each other the same functions as are brought by the brake-pressure modulator 8 of the exemplified embodiment of FIG. 1.

The brake-pressure modulator 8 can also be replaced in the precedingly recited arrangements and in general, possibly by use of simple adaptation measures by the brake-pressure modulator 41, in a way not illustrated in detail.

Furthermore a statement made in connection with one embodiment also holds for the other embodiments in an identical or corresponding way.

A person of ordinary skill in the art will recognize that the scope of protection of the invention is not exhausted by the preceding embodiments but comprises all embodiments which have the features recited in the patent claims.

It will be understood that each of the elements described above, or two or more together, may also find a useful application in other types of brake systems differing from the types described above.

While the invention has been illustrated and described as embodied in the context of a brake system with at least one brake circuit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A brake system comprising
   a brake-value furnishing unit delivering an electrical actuation signal upon actuation by a driver;
   at least one brake circuit having a pressure supply and actuated by feeding-in a brake pressure;
   a brake-pressure sensor at said brake circuit;
   a mechanical brake-pressure control device furnishing a redundant brake pressure;
   an electrical brake-pressure control device comprising at least one brake-pressure modulator which is actuatable by a magnet, wherein said brake-pressure modulator is associated with said brake circuit;
   said electrical brake-pressure control device further comprising an electronic control device receiving a brake-pressure signal from said brake-pressure sensor and receiving said actuation signal delivered by said brake-value furnishing unit and transforming said actuation signal into a brake-pressure demand request signal and further controlling a magnetic current delivered to said magnet of said brake-pressure modulator;
   said brake-pressure modulator having a first inlet, a second inlet and an outlet at which said brake-pressure modulator furnishes said brake pressure;
   said first inlet of said brake-pressure modulator being connected with said pressure supply;
   said second inlet of said brake-pressure modulator being connected with said mechanical brake-pressure control device;
   said outlet of said brake-pressure modulator being connected with said brake circuit;
   said brake-pressure modulator delivering a brake pressure which is composed of a component determined by said redundant brake pressure furnished by the mechanical brake-pressure control device and of a component determined by a value of said magnet current; and
   said electronic control device being constructed such that it sets said magnet current to a value required for determining said component of said brake pressure delivered by said brake-pressure modulator determined by a value of said magnet current such that the brake-pressure signal received from said brake-pressure sensor at said brake circuit equalizes the momentary brake-pressure demand request signal.

2. The brake system according to claim 1, wherein said brake-pressure modulator comprises a magnet-actuated valve device having a valve inlet and a valve outlet;
   wherein the magnet-actuated valve device includes a magnet serving as said magnet of said brake-pressure modulator, and wherein the magnet included in the magnet-actuated valve device receives said magnet current;
   a dual-circuit relay valve having a first control device and a second control device, a supply inlet and a relay outlet;
   said valve inlet of said magnet-actuated valve device serving as said first inlet of said brake-pressure modulator;
   said magnet-actuated valve device furnishing at said valve outlet of the magnet-actuated valve device a pressure which is dependent on a value of the magnet current fed to to the magnet of the magnet-actuated valve device;
   said first control device of said dual-circuit relay valve being connected with said valve outlet of said magnet-actuated valve device;
   a control inlet of said second control device of said dual-circuit relay valve serving as said second inlet of said brake-pressure modulator;
   said supply inlet of said dual-circuit relay valve being connected to said valve inlet of said magnet-actuated valve device; and
   said relay outlet of said dual-circuit relay valve device serving as said outlet of said brake-pressure modulator.

3. The brake system according to claim 1, wherein the electronic control device delivers a warning signal if the value of the magnet current is outside of a range of a prespecified set-point region.

4. The brake system according to claim 1, wherein the mechanical brake-pressure control device includes a retention device, where the retention device retains the redundant brake pressure up to a prespecified retaining pressure.

5. The brake system according to claim 4, wherein the retention device is furnished by an overflow valve.

6. The brake system according to claim 4, wherein the retention device is furnished by a load/empty valve.

7. The brake system according to claim 4, wherein the retaining pressure is a function of the brake pressure delivered by the brake-pressure modulator.

8. The brake system according to claim 4, wherein the electrical brake-pressure control device includes a load-dependent brake-pressure controller; wherein the retaining pressure is at most equal to the brake pressure delivered from the brake-pressure modulator in case of an empty vehicle.

9. The brake system according to claim 1, wherein the brake-pressure demand request signal is larger than the redundant brake pressure at least in a partial brake-value region.

10. The brake system according to claim 1 further comprising
    at least one relay valve, wherein the relay valve is contained in the brake circuit, wherein the brake pressure, delivered by the brake-pressure modulator, is fed as a control measure to the control device of the relay valve.

11. The brake system according to claim 10, wherein said relay valve is also magnet-actuated; and said relay valve being simultaneously employed as a control valve of an anti-skid protection system.

12. The brake system according to claim 1, wherein said brake-pressure modulator comprises a magnet-actuated valve device and a dual-circuit relay valve.

13. The brake system according to claim 12, wherein said magnet-actuated valve device has a valve inlet and an valve outlet;

a magnet of said magnet-actuated valve device serving as said magnet of said brake-pressure modulator;

said dual-circuit relay valve having a first control device and a second control device, a supply inlet and a relay outlet;

said valve inlet of said magnet-actuated valve device serving as said first inlet of said pressure-modulator;

said magnet-actuated valve device furnishing said valve outlet a pressure which is dependent on a value of magnet current fed to said magnet;

said first control device of said dual-circuit relay valve being connected with said valve outlet of said magnet-actuated valve device;

a control inlet of said second control device of said dual-circuit relay valve serving as said second inlet of said brake-pressure modulator;

said supply inlet of said dual-circuit relay valve being connected to said valve inlet of said magnet-actuated valve device; and said relay outlet of said dual-circuit relay valve device serving as said outlet of said brake-pressure modulator.

14. The brake system according to claim 1 further comprising a pressure-controlled trailer control valve, wherein an additional brake-pressure modulator; and wherein one pressure control device of said trailer control valve is connected to an additional modulator outlet of the additional brake-pressure modulator.

* * * * *